United States Patent [19]

Finger

[11] Patent Number: 4,724,332
[45] Date of Patent: Feb. 9, 1988

[54] SYNCHRONOUS LOAD LOCK-OUT CONTROL SYSTEM FOR BATTERY POWERED EQUIPMENT

[75] Inventor: Eugene P. Finger, Brewster, N.Y.
[73] Assignee: Curtis Instruments, Inc., Mt. Kisco, N.Y.
[21] Appl. No.: 743,782
[22] Filed: Jun. 12, 1985
[51] Int. Cl.$^4$ .............................................. H02I 3/20
[52] U.S. Cl. ................................. 307/10 BP; 361/92; 361/194; 320/40
[58] Field of Search .................... 307/10 BP, 10 R; 361/92, 170, 187, 194; 320/40, 48; 340/661, 663

[56] References Cited

U.S. PATENT DOCUMENTS

| | | | |
|---|---|---|---|
| 3,474,296 | 4/1967 | Rickey | 320/40 X |
| 3,522,481 | 3/1968 | Terzic | 320/40 X |
| 3,656,045 | 4/1972 | Frezzolini et al. | 307/10 BP X |
| 3,721,866 | 3/1973 | McIntosh | 361/194 X |
| 4,005,344 | 1/1977 | Gaind et al. | 307/10 BP X |
| 4,088,940 | 5/1978 | Ciarniello et al. | 307/10 BP X |
| 4,132,942 | 1/1979 | Yamamoto | 307/10 BP X |
| 4,137,557 | 1/1979 | Ciarniello et al. | 307/10 BP X |

FOREIGN PATENT DOCUMENTS 2521462  11/1975  Fed. Rep. of Germany ... 307/10 BP

Primary Examiner—William M. Shoop, Jr.
Assistant Examiner—Sharon D. Logan

[57] ABSTRACT

The system includes a battery state-of-charge monitoring circuit which is operable to produce a signal change when there is a change in the battery charge from an acceptable charge to a substantially reduced charge. The signal change from the monitor is connected to control a lock-out relay to disable a control circuit for a load controller for battery powered equipment which is to be locked out. A current detecting device is connected to detect the presence of current in the control circuit of the controller and is connected to hold off the lock-out operation of the lock-out relay while current is flowing in the control circuit to thereby assure that the lock-out of the load occurs after a normal interruption of the load control circuit.

15 Claims, 5 Drawing Figures

SYNCHRONOUS LOAD LOCK-OUT CONTROL SYSTEM FOR BATTERY POWERED EQUIPMENT

BACKGROUND OF THE INVENTION

This invention relates to a load lock-out control system for battery powered equipment which is particularly intended to save the batteries by locking out the load when a reduced charge condition of the batteries is detected. The invention is particularly useful in control systems for industrial lift trucks where the load which is locked out is the forklift motor load.

It is known to be very important in the operation of battery powered equipment to guard against excessive discharge of the batteries. Such excessive discharge can result in serious damage to the electric motors and control contactors (because of exposure to low voltage), as well as to the batteries. Furthermore, in the case of battery powered vehicles, the unexpected final depletion of the battery charge can leave the operator stranded at some distance from charging equipment or a source of fresh batteries. For this reason, it has become the custom to equip battery powered equipment such as industrial forklift trucks, and gold carts, and other vehicles, with battery state-of-charge meter systems, sometimes referred to as "battery fuel gauges". These state-of-charge meter systems may operate on various principles, including detection and integration of current supplied by the battery, detection of battery terminal voltage, or combinations of the two. These state-of-charge meter sytems may sometimes be referred to below as "battery state-of-charge monitoring circuits".

Two very satisfactory battery state-of-charge meter systems which may preferably be employed in conjunction with the present invention are exemplified by U.S. Pat. No. 4,193,026 for a "Method and Apparatus for Measuring the State of Charge of a Battery by Monitoring Reductions in Voltage" issued Mar. 11, 1980 to Eugene P. Finger and Eugene A. Sands and assigned to the same assignee as the present application, and patent application Ser. No. 321,671 filed on Nov. 16, 1981 by Eugene P. Finger for a "Battery State of Charge Metering Method and Apparatus" and assigned to the same assignee as the present application. Both of the above-mentioned patents relate to battery state-of-charge meters which operate on the principle of integrations of battery terminal voltage excursions under a voltage threshold level which are indicative of battery discharge events.

Unfortunately, the operator of the battery powered equipment often is inattentive to the battery state-of-charge meter, or overlooks or disregards the meter indications in his eagerness to proceed with the task at hand. For this reason, it has become generally recognized as desirable to reduce the drain on the battery by locking out the function of at least part of the equipment when the battery charge reaches a depleted level at which recharge is required. This is commonly referred to as a load lock-out function.

With a forklift truck, two electric motors are conventionally used, one for traction, and one for lifting loads with the lifting fork. Both of these motors are required for ordinary operations. However, only the traction motor is required for returning the forklift truck to a charging station. Accordingly, it has become the custom to have the battery state-of-charge monitor disable the lift motor (locking out that load) when the battery charge is depleted, preferably after having given the operator a warning signal. The operator then has no recourse but to use the traction motor to return to the charging station to obtain a recharge.

The forklift function is typically carried out with a hydraulic drive mechanism, in which the electric lift motor operates a hydraulic pump which causes the hydraulic lift drive to raise the load. When the desired height is reached, the lift motor is not longer required, and is typically switched off. When the forklift is to be lowered, that operation can be accomplished by simply opening a valve in the hydraulic lift drive without energizing the lift motor. Accordingly, the load and the forklift mechanism can be lowered even if the lift motor is locked out. However, in many systems, the lift motor can be locked out while it is operating ot lift the load. This means that the lifting operation cannot be completed, and the load often cannot be removed from the lift forks, and must be carried with the forklift truck back to the charging station. This can be very inconvenient when the load is consigned to a particular shipment.

For the above reasons, a better system is to synchronize the load lock-out function with the completion of any lifting operation which is in progress when the load lock-out function is called for. This synchronized operation may be referred to as a synchronous mode of load lock-out operation. The other mode of operation in which the load lock-out function is not synchronized with the normal switching off of the lift motor may be referred to as an asynchronous mode of operation. the synchronous mode of operation is very advantageous because it permits the operator to complete the lifting of the load and the subsequent depositing of the load before it is necessary to move the forklift truck back to the charging station.

One example of a battery monitor and a synchronous load lock-out device combination which is presently commercially available is a Curtis model 933/3 battery controller sold by Curtis Instuments Inc., Mt. Kisco, N.Y., U.S.A. That controller uses a silicon-controlled rectifier (SCR) as the load lock-out switching device. The SCR is used in a mode in which a constant DC enabling signal is supplied to the control electrode (gate) of the SCR as long as the battery charge is sufficient, and is removed when the battery charge is depleted. As long as the DC control voltage is available, the SCR will conduct current to a controller for the lift motor, whenever such current is called for. Furthermore, because of the inherent characteristics of the SCR, it continues to conduct an existing current even if the control voltage is removed because the battery charge has been depleted. However, once interrupted, the current cannot be reestablished through the SCR in the absence of the control voltage.

This system works well, except that it is essential for the operation of the system that the SCR be connected at a predictable position in the lift motor controller circuit so that the potential on the power electrodes of the SCR is predictable, and so that the potential on the control electrode may be properly set. This presents a substantial disadvantage, since the forklift trucks have different wiring arrangements, and it would often be convenient to interrupt the lift controller circuit at any selected position in that circuit, without being restricted to a particular designated position in the circuit.

It has also been found that the interconnection between the monitoring circuit and the lift motor controller circuit through the SCR may lead to troublesome voltage transients being carried from the power side of the system back into the battery state-of-charge monitoring circuit. These transients can sometimes cause difficulties since they may be interpreted as signal pulses within the monitoring circuit.

Accordingly, it is one object of the present invention to provide an improved synchronous load lock-out control system for battery powered equipment which permits interruption of virtually any selected portion of the contactor control circuit for locking out the load.

Another object of the invention is to provide an improved synchronous load lock-out control system for battery powered equipment in which an associated battery state-of-charge monitoring circuit is electrically isolated completely from the circuit which is locked out.

Further objects and advantages of the invention will be apparent from the following description and the accompanying drawings.

SUMMARY OF THE INVENTION

In carrying out the above objects there is provided a load lock-out control for intermittently energized battery powered equipment comprising means for monitoring the state of charge of the battery, said monitoring means being operable to produce a signal change when there is a change in the battery charge from an acceptable charge to a substantially reduced charge, a controller for controlling current to the battery powered equipment, a control circuit for said controller, a control switch means connected in series in said control circuit, a lock-out relay connected in series in said control circuit, said lock-out relay being connected to respond to the signal change from acceptable battery charge to reduced battery charge from said monitoring means to open said control circuit, a current-detecting means connected to detect the presence of current in said control circuit for said controller, said current-detecting means being connected to said lock-out relay and being operable to hold off the lock-out operation of said lock-out relay while current is flowing in said control circuit.

DETAILED DESCRIPTION OF THE PREFERRED EMBODIMENTS

Figure 1:
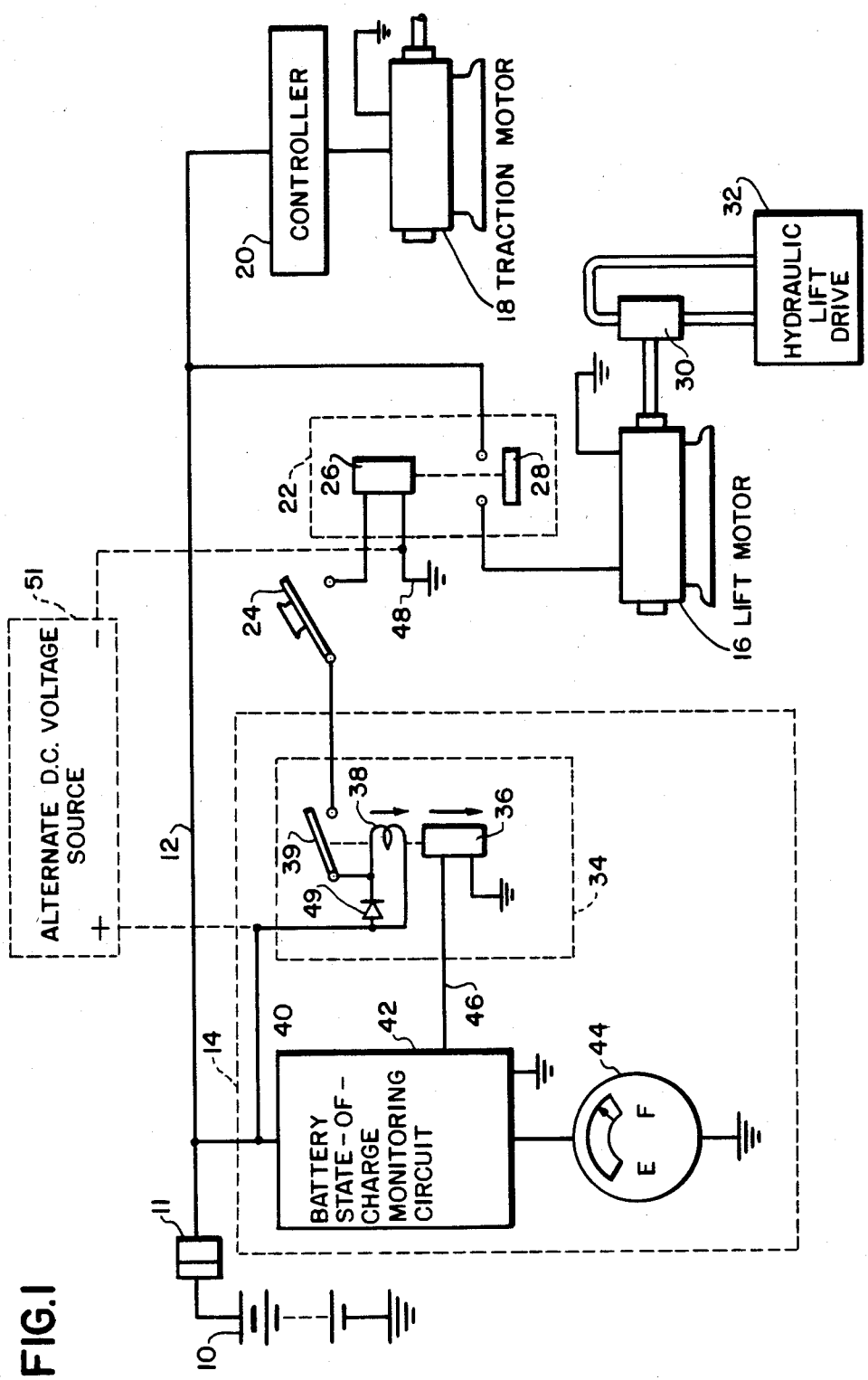
FIG. 1 is a schematic circuit diagram of a preferred embodiment of the invention as it is intended to be incorporated into the circuitry of an industrial forklift truck.

Referring particularly to FIG. 1, there is shown a control system connected in circuit with the motors for a forklift truck. The battery is illustrated at 10, and the battery is connected through a connector 11 and a bus 12 to a control 14, to a lift motor 16, and to a traction motor 18. The connection to the traction motor 18 is through a controller 20. The traction motor controller 20 will normally include one or more manual controls for determining speed and direction of movement.

The connection to the lift motor 16 is through a controller 22, 24 which consists of a load control contactor having a winding 26 controllable by a manual switch 24. When the switch 24 is closed, the winding 26 of the contactor 22 is energized, closing the associated contacts 28, and carrying current from the bus 12 to the motor 16. The motor 16 is connected to drive a hydraulic pump 30 to energize a hydraulic lift drive 32.

The control 14 includes a lock-out relay structure 34 having a voltage winding 36 and a current winding 38 and a normally open contact 39 associated with the relay armature (not separately illustrated). Contact 39 completes a circuit to the manual lift motor control switch 24 from the bus 12 through a connection 40, and through the current winding 38.

The state of charge of the battery is constantly monitored by a battery state-of-charge monitoring circuit 42, which preferably provides a voltage reading indicating battery state of charge to an expanded scale voltmeter 44 to give a visual indication of the state of charge of the battery 10.

As long as the battery state of charge monitoring circuit 42 detects that the state of charge is satisfactory, that circuit provides a voltage through connection 46 to the voltage winding 36 of the load lock-out relay structure 34 to hold relay contact 39 closed. However, as soon as the monitoring circuit 42 detects that the state of charge is depleted, the voltage on connection 46 drops to zero, de-energizing the voltage winding 36. This would normally cause the relay to drop out, opening contact 39. However, as indicated by the arrows beside the two windings 36 and 38 of the relay, those windings are arranged in an aiding relationship so that the electromagnetic force of the current winding 38 assists the electromagnetic force of the voltage winding 36. This assistance is sufficient to hold the relay picked up, and the contact 39 closed independent of winding 36, whenever current is flowing through the contactor control circuit of which the current winding 38 is a part.

Thus, if voltage winding 36 is de-energized while current is flowing to the lift motor 16 by reason of the operation of the control circuit including the relay contact 39 and the current winding 38, the relay remains picked up, and the lift motor operation is not interrupted until the lift motor control circuit is opened by the opening of the manual switch 24. In this manner, synchronous operation is achieved.

Also, this assures that the current interrupting capacity of the manual switch 24 is used exclusively for interrupting the current, and the contact 39 need not interrupt any appreciable current.

As an optional feature, a diode 49 may be connected in parallel with the winding 38 in order to limit the voltage drop across winding 38 at high currents. The diode 49 must be a high current diode, and may typically have a forward voltage dop of 0.6 volts. The winding 38 is then designed to operate in the voltage range up to 0.6 volts. The diode 49 is particularly useful for low voltage battery systems, such as 12 volt systems, because a higher voltage drop in the winding 38 will reduce the voltage supplied to the contactor winding 26 too much. With this arrangement, the winding 38 is designed to be sensitive to a sufficiently low current and low voltage drop, without the disability of too high a voltage drop, and too much energy loss within the winding, at higher currents.

It is to be noted that because of the electrical separation between the relay contacts 39, and the voltage winding 36 of the relay structure 34, there is complete electrical isolation between the associated circuits, with all of the advantages which that isolation provides. Thus, there is no possible problem of transient voltages from the power-handling end of the system getting back to the charge monitoring circuit 42 through the connection 46. Furthermore, as illustrated in the drawing, it is possible to connect the load control contactor lock-out contacts 39 virtually anywhere in the load control contactor circuit. As illustrated in the drawing, the connection is in the positive (ungrounded) end of that circuit. With a prior art SCR controller, it was necessary to connect the SCR in a consistant position in the system, and preferably in the negative grounded end of the lift motor controller circuit corresponding to the position indicated at 48.

In order to emphasize that the current winding 38, and the relay contact 39 of the lock-out relay 34 can be completely dielectrically isolated from the rest of the circuit, an alternate DC voltage source is indicated by the dotted box 51 as an alternate source for the DC voltage and current which actuate the controller 22 through the current winding 38. The alternate DC voltage souce 51 may be any source, and need not be related to the main battery 10. When the alternate source 51 is connected in circuit, the connection 40 to battery 10 is eliminated, and the connection 48 to ground at the contractor 26 may be eliminated. It will be understood, of course, that the alternate DC voltage source 51 may be grounded at some point if desired. However, it is not important where the ground point connection is made. It should also be emphasized that, while a DC current is required through the winding 38, the arrangement of the winding 38, the contact 39, the control switch 24, and the control contactor winding 26 may be changed. Thus, these elements may be connected in any order in series between the positive and the negative sides of the voltage source.

The current winding 38 is sometimes characterized below as being a current detecting means to detect the presence of current in the control circuit for the controller 22. This current detecting means consisting of winding 38 is connected to the lock-out relay by electromagnetic coupling to that relay to hold off the lockout operation of the lock-out relay while current is flowing in the control circuit including the controller 22.

Figure 2:
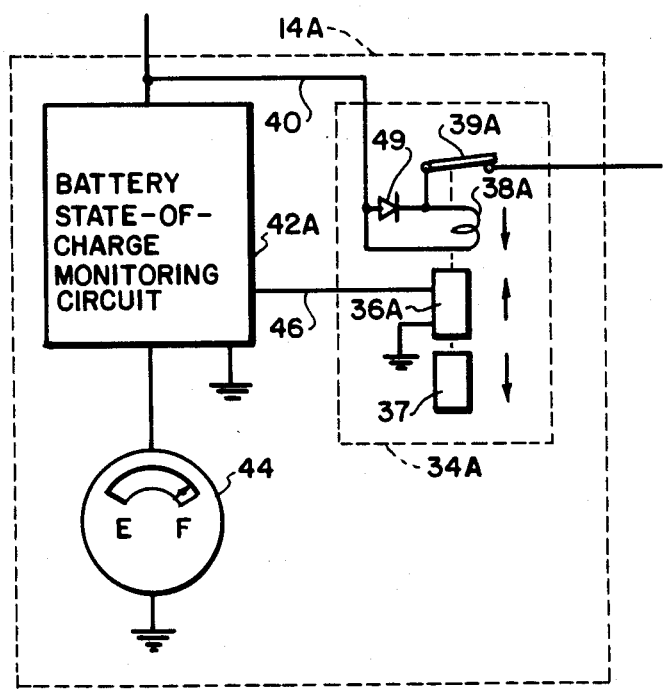
FIG. 2 is a schematic circuit diagram illustrating a first modification of the embodiment of FIG. 1 employing a relay having a normally closed contact instead of a normally open contact.

FIG. 2 illustrates a modification 14A of the control 14 of FIG. 1. In this modification, the relay contact 39A is normally closed by the magnetic force of a permanent biasing magnet 37. The electromagnetic force of the current winding 38A aids the permanent bias magnet 37 in maintaining the relay contact 39A closed.

The electromagnetic force of the voltage winding 36A opposes both the permanent biasing magnet 37 and the current winding 38A, all as indicated by the respective arrows for these three magnetic devices. The state-of-charge monitoring circuit 42A is operable to emit a positive voltage signal on connection 46 only when the battery state of charge is reduced, and to provide a zero output when the battery voltage is satisfactory.

The armature of the relay structure 34A is normally picked up by the magnetic bias of magnet 37, and contact 39A remains closed. When current is present, the electromagnetic force of winding 38A simply reinforces the magnetic bias of magnet 37, and does not change the condition of the relay contacts. When the battery is depleted, as detected by the monitoring circuit 42A, a signal is emitted to winding 36A which bucks the magnetic force of bias magnet 37 to drop out the armature and open the contact 39A. However, the current winding 38A, which is in magnetic opposition to the voltage winding 36A, prevents the winding 36A from dropping out the relay armature if current is being conducted through contact 39A and current winding 38A. Thus, opening of the control circuit for the controller 22 for the lift motor 16 is delayed until that circuit is manually opened by control switch 24 (FIG. 1).

Figure 3:
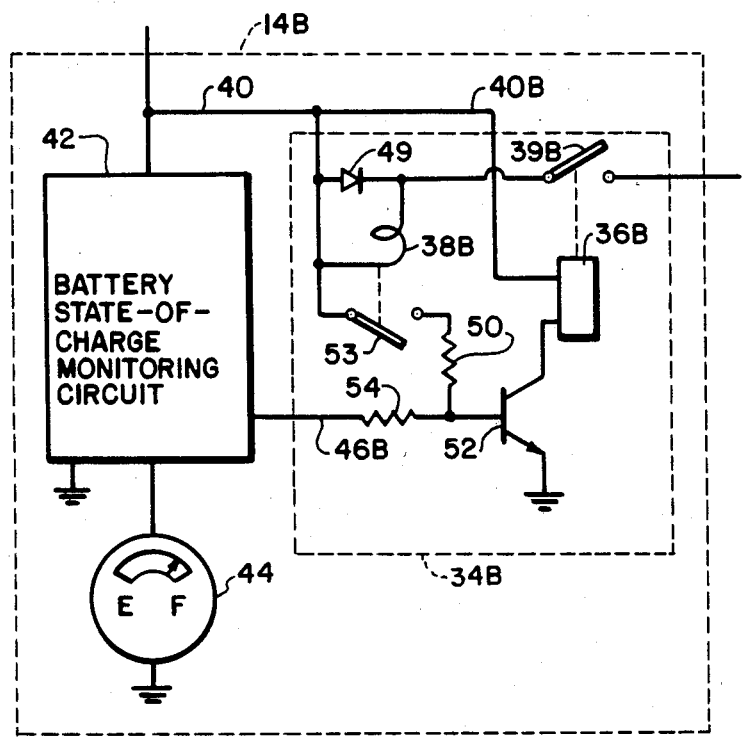
FIG. 3 is a schematic diagram illustrating another modiification of the embodiment of FIG. 1 employing separate voltage and current relays.

FIG. 3 is another modification of the embodiment of FIG. 1 which illustrates a modified control 14B. In the control 14B, the current winding function is carried out by means of a separate relay having a contact 53 which is actuated by the current winding 38B. As illustrated in the drawing, as long as current is flowing through the current winding 38B, the associated relay contact 53 is closed, carrying voltage from connection 40 through the contact 53, and through an associated resistor 50 to the base electrode of a transistor 52 to assure that that transistor is switched on. This maintenance of current through the emitter and collector electrodes of transistor 52 assures that current is supplied to the voltage winding 36B through a connection 40B. Normally, in the absence of current through winding 38B, transistor 52 is switched on by the current supplied from the battery state-of-charge monitoring circuit through connection 46B and resistor 54. That source of energization is removed when low charge state is detected, and the lockout operation is to be performed. However, the energization of transistor 52 through current relay contact 53 assures that, as long as current is flowing through the lift motor contactor 22 control circuit, and through the current winding 38B, there will be voltage supplied to the voltage winding 36A to keep a contact 39B closed.

Thus, even though a voltage signal from the monitoring circuit 46 is no longer available, by reason of depletion of the battery, the voltage winding 36A is nevertheless energized so that the relay including contacts 39B continue picked up as long as current flows through current winding 38B.

It will be understood that a "Hall" effect device responsive to the field generated by the current winding 38B may be substituted for the relay contact 53.

Figure 4:
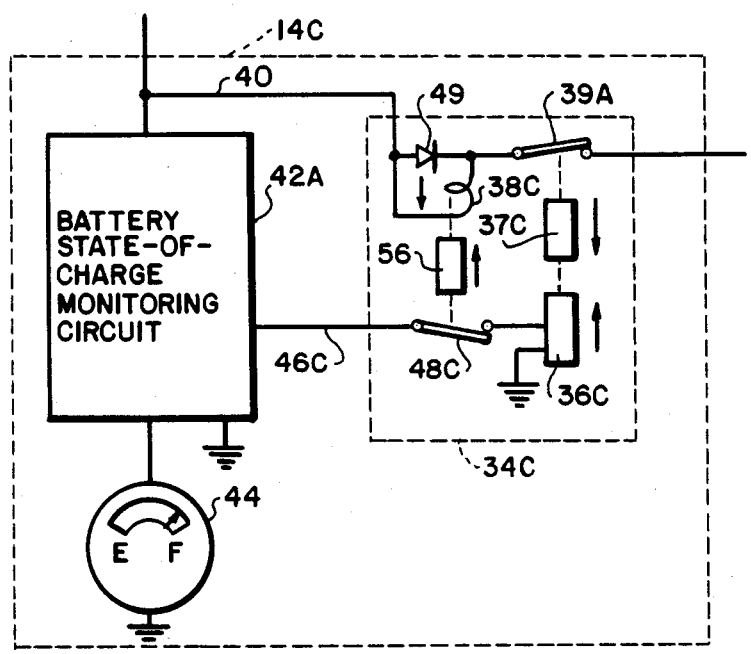
FIG. 4 is a further modification of the embodiment of FIG. 3 employing relays having normally closed contacts instead of normally open contacts.

FIG. 4 illustrates still another modification of the invention employing a separate current relay in a system somewhat analagous to the system of FIG. 2. As in the embodiment of FIG. 2, the monitoring circuit 42A issues a positive voltage on a connection 46C only when the state of charge is depleted, to thereby energize the voltage winding 36C and open the normally closed contact 39A to interrupt the lift motor controller circuit. However, the connection 46C to the voltage winding 36C is interruptible by contacts 48C of a separate current relay including the current winding 38C. The contact 38C is normally closed.

Accordingly, whenever current is flowing through the lift motor controller circuit, and through the current winding 38C, the relay contact 48C is open, holding off the operation of the relay including voltage winding 36C so that the normally closed contact 39A remains closed. However, as soon as the lift motor controller circuit is manually opened, the separate relay, including the current winding 38C, closes the contacts 48C, and the voltage winding 36C is energized to open contacts 39A and disable the lift motor controller circuit.

As in the embodiment of FIG. 2, the relay including winding 36C is normally magnetically biased to the closed position by a permanent biasing magnet 37C. The winding 36C is in magnetic opposition to the permanent biasing magnet 37C, as indicated by the arrows. Thus, when winding 36C is energized, the net magnetic flux is reduced, permitting contact 39A to open. Similarly, the relay contact 48C is normally biased closed by a permanent biasing magnet 56 which is opposed by the electromagnetic force of the current winding 38C to open the contacts 48C.

In each of the above described embodiments, it may be said that the monitoring circuit 42 produces a signal change (at connection 46) when there is a change in the battery charge from an acceptable charge to a substantially reduced charge. In the embodiments of FIGS. 1 and 3, this change involves a drop in voltage from a positive value to a zero value with respect to ground. In the embodiments of FIGS. 2 and 4, this signal change involves a change from a zero value to a positive value sufficient to energize the associated voltage winding 36A or 36C. One of the interesting and useful features of the invention is that the relay contacts 39 (and 39A, 39B) are never called upon to either close or interrupt any substantial current. Referring to the embodiment of FIG. 1, the manual lift motor control switch 24 is never closed when the battery 10 is first connected to the system. Therefore, the relay including voltage winding 36 is always picked up, with the controller circuit completed to the manual control switch 24, before control switch 24 is closed. Furthermore, and more important, the relay contact 39 never opens while the manual switch 24 is closed, since current is maintained in the circuit and the relay is maintained picked up. Since the operation of the embodiment of FIG. 3 is perfectly analagous to the operation of FIG. 1, the same statements made just above apply.

In the embodiment of FIG. 2, the relay contact 39A is always closed until the conditions of no current in the current winding 38A and an actuating voltage in winding 36A are achieved. Accordingly, here again, the relay contacts need not complete or interrupt any substantial current. It is only necessary that the contacts be capable of carrying the current necessary to actuate the controller contactor 22. Again, the operation of the embodiment of FIG. 4 is analagous to that of FIG. 2, and the same statements as given above are applicable. Because of the lack of a need for providing relay contacts which are capable of initiating or interrupting any substantial current, it is possible to employ a very small and inexpensive and compact relay device such as a reed relay. It is preferred that a reed relay is employed for the relay structure 34 of FIG. 1 or 34A of FIG. 2. In the embodiments of FIGS. 3 and 4, two reed relays are preferably employed for accomplishing the two separate relay functions.

In this specification, separate references are made to relay armatures, and relay contacts. However, in a reed relay, the relay contact and the relay armature are usually combined in a single structure. Accordingly, it will be understood that when reed relays are employed, any reference to a relay contact or to a relay armature refers to the same component. Thus, the separate references to these relay components does not necessarily imply that a reed relay cannot be employed.

In a particular practical embodiment corresponding to FIG. 1, a reed relay may be employed for the relay structure 34 having the following specifications: a nominal pickup voltage on the voltage winding 36 of 12 volts, with a guaranteed pickup at 9 volts, with a 2,000 ohm winding which draws 6 milliamperes at 12 volts. The current winding 38 has a resistance no greater than 0.5 ohm and permits relay dropout at a current in the range from 25 up to 250 milliamperes. The 25 and 250 milliamperes therefore represent guaranteed lower and upper limits on drop-out current. Such a reed relay has been found to be capable of closing a circuit when it will carry as much as one ampere, and of carrying a load while closed of as much as three amperes. However, because of the series-connected hold-in current winding 38, the relay is guaranteed never to be called upon to interrupt more than 250 milliamperes, the current at which the winding 38 no longer holds the relay in. Since the relay is never called upon to interrupt any substantial current, it is capable of controlling a load which is far beyond its usual rating, which is predicated upon its current interruption capabilities.

It is a notable feature of the invention, which is particularly evident, and particularly useful in the embodiments of FIGS. 1 and 2, that the current carrying relay contacts 39 and 39A are held more tightly as the current is increased in the current winding 38 or 38A. Thus, the high current carried by the current winding has the advantageous effect of holding the relay contacts very tightly during operation of the system. If the invention is used on a forklift truck, this is advantageous because it helps to prevent accidental opening of the contacts due to mechanical shock or vibration. This is especially important in the system of the present invention when employing a relay which is not rated to interrupt the current which is being carried on a steady state basis. Thus, an unintentional or accidental opening because of mechanical shock or vibration could lead to a serious failure of the relay, or welding of the contacts. Accordingly, it is an interesting combination feature of the invention that the mechanism of the current winding 38 (referring to FIG. 1), which keeps the relay contacts closed until the circuit is opened by the control switch 24, also assures that there is a high contact pressure to avoid accidental opening of the contacts. These two features and effects reinforce the feasibility of using a small relay, such as a reed relay, which would be overrated if required to interrupt the circuit which is being controlled.

The relay may be described as having a "high hysteresis" because a substantial voltage is required across the voltage winding 36 to pick up the relay, while a miniscule voltage must be achieved across the current winding 38 to cause the relay to drop out.

Figure 5:
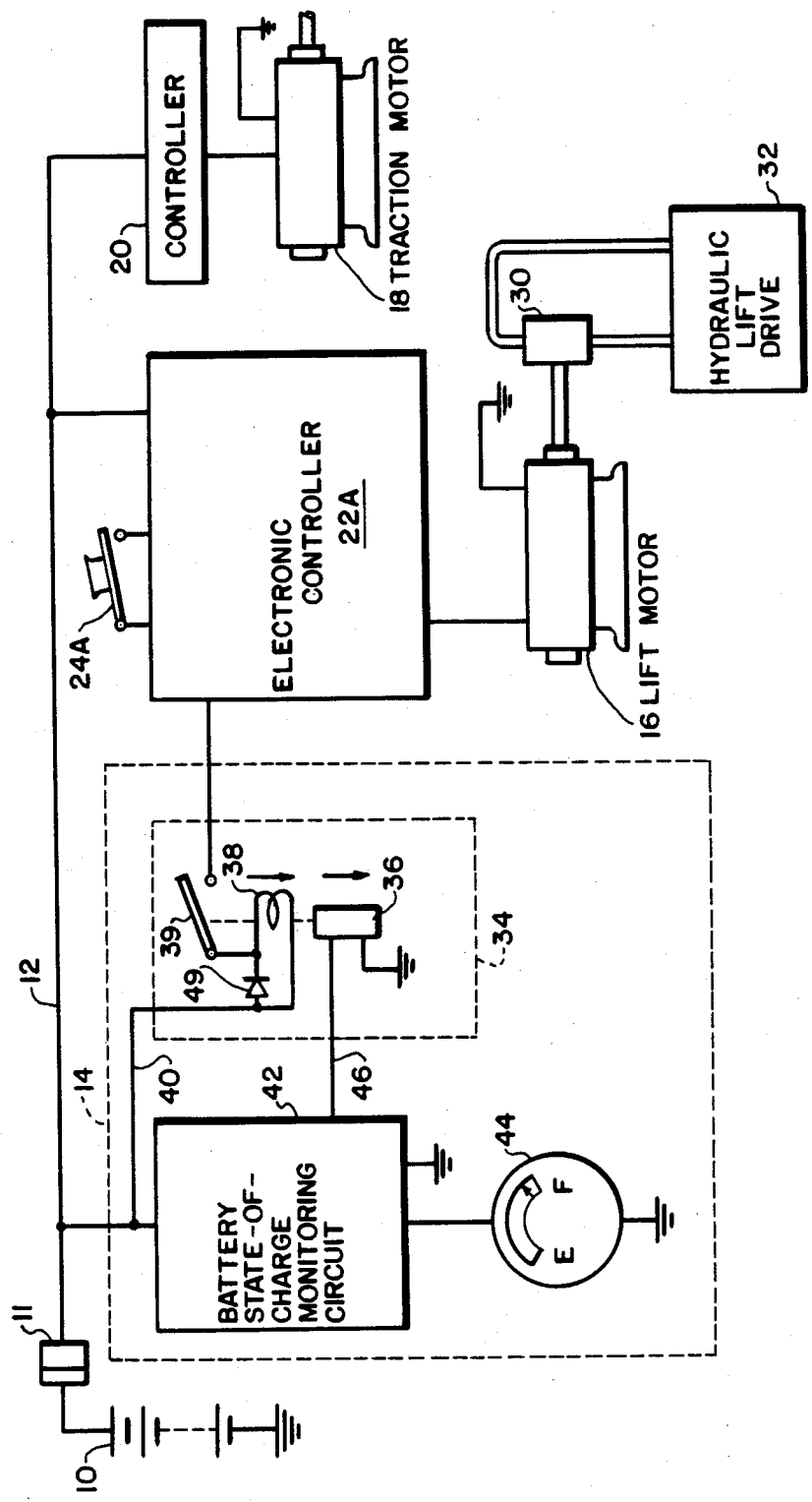
FIG. 5 is a further modification of the embodiment of FIG. 1 which incorporates an electronic controller for the lift motor.

FIG. 5 is another modification of the embodiment of FIG. 1 in which an electronic controller has been substituted for the contactor 22 of FIG. 1. In FIG. 5, the system works in a manner identical to that of FIG. 1 if the electronic controller 22A requires a substantial operating current through the relay contact 39 whenever the lift motor is energized. Thus, the lock-out relay 36 will not operate to open the contact 39 until the energization of the lift motor is substantially discontinued, and the current through winding 38 falls below the relay hold-in level.

However, an electronic controller, such as the controller 22A of FIG. 5 may typically incorporate its own logic for determining whether or not the lift motor 16 is to be locked out completely, or for determining some other manifestation for the low battery condition. For instance, the electronic controller 22A may typically provide for operation of lift motor 16 at half speed rather than full speed. This change in the operation of the lift motor is important enough to get the operator's attention, and to convince the operator that he must return to the charging station to have his batteries exchanged or recharged, without the necessity of disabling the lift completely. For such a control system, in which the electronic controller 22A itself incorporates the logic for changing the operation of the control system in an appropriate manner, the hold-in function of the current winding 38 is not required. However, in such a system, only a small control current need be supplied through the contacts 39 to the electronic controller 22A. This current is typically less than 25 milliamperes. Since the preferred form of the relay, as specified just above, is guaranteed to drop out at any current of less than 25 milliamperes in the winding 38, the hold-in function is not effective at all when the current required by the electronic controller 22A is less than 25 milliamperes. Thus, the same control 14 which is used in the embodiment of FIG. 1 for synchronous operation of the lift motor controller is also useful in the embodiment of FIG. 5 for asynchronous operation of the electronic lift motor controller 22A. The term "asynchronous" as used in the preceding sentence refers to the fact that the operation of the lock-out relay 36 is not necessarily synchronized with the opening of the opeator control switch 24A which operates the lift motor 16. In the electronic controller 22A, the operator's switch 24A is not necessarily connected directly, or in series with, the relay contact 39.

While the invention has been described primarily in terms of the application of the invention to a forklift truck, it will be appreciated that the invention is also applicable to other intermittently energized battery powered equipment.

The invention has been described entirely in terms of having a battery state-of-charge monitoring circuit 42 which is separate from the voltage winding 36. However, in a very simple system, the voltage winding 36 may itself be the device which determines battery state of charge, in a rudimentary way, be detecting a voltage which is derived from the battery terminal voltage. In such a system, it might be said that the state of charge monitor 42 is combined with the voltage winding 36.

Preferably, such a system would incorporate extensive electrical damping so that the winding 36 would not respond to temporary voltage fluctuations, but only to a sustained depressed voltage indicative of a reduced charge condition. An expanded scale voltmeter 44 could be employed to read the voltage being applied to the voltage winding 36 as a visual indication of the state of charge. The electrical damping in such a system would be achieved essentially by a very low-pass filter.

It should be appreciated that such a system would not give results which are nearly as accurate as the system as previously disclosed, incorporating a sophisticated battery state-of-charge monitoring circuit. However, a control is achievable in this manner which would prevent damage to the battery.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. A load lock-out control for intermittently energized battery powered equipment comprising means for monitoring the state of charge of the battery, said monitoring means being operable to produce a signal change when there is a change in the battery charge from an acceptable charge to a substantially reduced charge, a controller for controlling a current to the battery powered equipment, a control circuit for said controller, a lock-out relay connected in said control circuit for controlling said controller, said lock-out relay being connected to respond to the signal change from acceptable battery charge to reduced battery charge from said monitoring means to open said control circuit, a current-detecting means connected to detect the presence of current in said control circuit for controlling said controller, said current-detecting means being connected to said lock-out relay and being operable to hold off the lock-out operation of said lock-out relay while current above a first predetermined value is flowing in said control circuit so that the lock out operation of said lock-out relay will occur only during a condition in which the control circuit current is below said first predetermined value.

2. A control as claimed in claim 1 wherein there is provided a control switch means connected in series in said control circuit when the function provided by said battery powered equipment is to be interrupted to thereby disable the hold-off of the lock-out operation of said lock-out relay by said current detecting means.

3. A control as claimed in claim 1 wherein said current detecting means is inoperable to hold off the lock-out operation of said lock-out relay when the current flowing in said control circuit is below a second predetermined value which is below said first predetermined value.

4. A control as claimed in claim 1 wherein said current-detecting means comprises an electromagnetic current winding.

5. A control as claimed in claim 4 wherein said current-detecting means electromagnetic current winding comprises a second winding on said lock-out relay.

6. A control as claimed in claim 4 wherein there is provided a separate relay, said current-detecting means electromagnetic current winding comprising the winding of said separate relay, said separate relay including controllable relay contacts connected to control the operation of said lock-out relay.

7. A control as claimed in claim 1 wherein said lock-out relay includes a voltage-responsive winding which is energized whenever the battery charge is acceptable and de-energized upon the signal change when the battery charge is reduced so that the relay armature is pulled up under acceptable charge conditions and released under reduced battery charge conditions, and wherein said control circuit through at least one normally open contact of said lock-out relay includes a series connection.

8. A control as claimed in claim 7 wherein said current-detecting means comprises a current winding which is connected to said lock-out relay by means of a magnetic coupling such that said current-detecting means winding comprises a current winding upon said lock-out relay, said current winding being arranged to electromagnetically aid said voltage winding of said lock-out relay and being operable to maintain the armature of said winding picked up when said voltage winding is de-energized while said current is being detected.

9. A control as claimed in claim 7 wherein said current-detecting means comprises a separate relay having a current winding and having a normally open contact circuit connected to supply voltage to said lock-out relay voltage winding separately from said monitoring means to maintain said lock-out relay energized while current is being detected by said current-detecting means.

10. A control as claimed in claim 1 wherein said lock-out relay includes a voltage-responsive winding which is de-energized whenever the battery charge is acceptable and energized upon the signal change when the battery charge is reduced, and wherein said control circuit includes a series connection through at least one normally closed contact of said lock-out relay.

11. A control as claimed in claim 10 wherein the normally closed contact of said lock-out relay is maintained normally closed by means of a permanent magnet which provides a permanent magnetic bias to the armature of said relay to maintain said contact closed, and wherein the electromagnetic force of said voltage responsive winding is magnetically opposed to the magnetic force of said permanent magnet to cause the opening of said normally closed contact by reducing the magnetic flux sufficiently to cause the relay armature to drop out.

12. A control as claimed in claim 10 wherein said current-detecting means comprises a current winding which is connected to said lock-out relay by means of a magnetic coupling such that said current-detecting means winding comprises a current winding upon said lock-out relay, said current winding being arranged to electromagnetically oppose said voltage winding of said lock-out relay and being operable to maintain said normally closed contact closed when said voltage winding is energized while said current is being detected.

13. A control as claimed in claim 10 wherein said current-detecting means comprises a separate relay having a current winding and having a normally closed contact connected in series with said lock-out relay voltage winding to maintain said lock-out relay de-energized while current is being detected by said current-detecting means.

14. A control as claimed in claim 7 wherein said control is combined in an electrically powered forklift truck and wherein the intermittently energized battery powered equipment comprises the load lift motor for the forklift truck, and wherein said forklift truck includes a hydraulic load lift drive which is operable in the lifting direction in response to the operation of said load lift motor and which is operable in the lowering direction independent of said load lift motor.

15. A control as claimed in claim 7 wherein said lock-out relay comprises a reed relay.

* * * * *

UNITED STATES PATENT AND TRADEMARK OFFICE
CERTIFICATE OF CORRECTION

PATENT NO. : 4,724,332
DATED : Feb. 9, 1988
INVENTOR(S) : Eugene P. Finger

It is certified that error appears in the above-identified patent and that said Letters Patent are hereby corrected as shown below:

Column 1, line 24,        "gold" should read --golf--.

Column 2, line 15,        "ot" should read --to--.

Column 5, lines 34-35,    "contractor" should read --contactor--.

Column 6, line 64,        "contact 38C" should read --contact 48C--.

Column 10, line 33,       after "circuit", insert --and operable to open said control circuit--.

Signed and Sealed this

Twenty-fifth Day of October, 1988

Attest:

DONALD J. QUIGG

*Attesting Officer*        Commissioner of Patents and Trademarks